United States Patent
Ozeki

(10) Patent No.: US 6,372,862 B1
(45) Date of Patent: *Apr. 16, 2002

(54) PHENOLIC RESIN-BASED ADHESIVE COMPOSITION AND PROCESS FOR PRODUCING THE SAME

(75) Inventor: Shinichi Ozeki, Fujieda (JP)

(73) Assignee: Sumitomo Durez Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/580,545

(22) Filed: May 30, 2000

(30) Foreign Application Priority Data

Sep. 14, 1999 (JP) .......................... 11-259711

(51) Int. Cl.⁷ .................................. C08G 8/28
(52) U.S. Cl. ...................................... 525/491
(58) Field of Search ........................ 525/491

(56) References Cited

U.S. PATENT DOCUMENTS

| | | | | |
|---|---|---|---|---|
| 3,932,689 A | * | 1/1976 | Watanabe | 428/418 |
| 3,962,397 A | * | 6/1976 | Narui | 264/144 |
| 3,982,359 A | * | 9/1976 | Elbel | 51/295 |
| 4,184,972 A | * | 1/1980 | Pevzner | 252/62.54 |

FOREIGN PATENT DOCUMENTS

JP        46034798        10/1971

OTHER PUBLICATIONS

European Search Report in coounterpart European application No. 00 11 1556, dated May 28, 2001.
Derwent Publication Patent Abstract XP–002167246 for JP 50005736 (Mar. 6, 1975).
Derwent Publication Patent Abstract XP–002167248 for SU 347956.

* cited by examiner

*Primary Examiner*—Paul R. Michl
(74) *Attorney, Agent, or Firm*—Smith, Gambrell & Russell, LLP

(57) ABSTRACT

The present invention provides phenolic resin-based adhesives which do not produce waste water and industrial wastes and which have good adhesive force, especially after being exposed to thermal history. That is, the present invention provides a phenolic resin-based adhesive composition which contains a polyvinyl butyral, a novolak type phenolic resin or a novolak type phenolic resin and a resol type phenolic resin, and hexamethylenetetramine and which is obtained by uniformly melt-mixing these components, or a phenolic resin-based adhesive composition which contains a polyvinyl butyral, an epoxy resin, a novolak type phenolic resin or a novolak type phenolic resin and a resol type phenolic resin, and hexamethylenetetramine and which is obtained by uniformly melt-mixing these components.

16 Claims, No Drawings

PHENOLIC RESIN-BASED ADHESIVE COMPOSITION AND PROCESS FOR PRODUCING THE SAME

The present invention relates to a phenolic resin-based adhesive composition which is excellent in adhesive strength, especially adhesive strength after heating, and operability, and which does not generate volatile solvents or waste water, and to a process for producing the same.

Conventional phenolic resin-based adhesives are generally those of solvent type which are prepared by dissolving, in solvents such as alcohols or ketones, phenolic resins (novolak type phenolic resins and hexamethylenetetramine or resol type phenolic resins) or mixtures of phenolic resins with polyvinyl butyral, polyvinyl acetate or the like, and those of aqueous type which are prepared by emulsifying or completely water-solubilizing them (the solvent type or aqueous type phenolic resin adhesives are disclosed, for example, in "Adhesive Data Book" pages 13–18, edited by Japan Adhesive Society and published from Nikkan Kogyo Shinbun-sha, in 1990; and "Adhesive Application Techniques" pages 218–219, edited by Limited Company N.N. and issued by Nikkei Gijutsu Tosho Co., in 1991). Use of these solvent type and aqueous type phenolic resin-based adhesives needs to coat the adhesives on materials to be bonded, dry the coat and hot-press the materials. The drying step requires a long time to volatilize the solvent or water, resulting in deterioration of operability, and furthermore the volatilized solvent or water must be recovered or abandoned.

On the other hand, powder type phenolic resin-based adhesives which require no drying step and produce no industrial wastes, have been investigated. When the novolak type phenolic resins are used as such adhesives, in many cases, they are mixed with pulverized hexamethylenetetramine (see, for example, "Adhesive Handbook" pages 250–251, edited by Japan Adhesive Society, published from Nikkan Kogyo Shinbun-sha, in 1971), and a uniform coat cannot be formed in coating of the adhesives on materials to be bonded, and no sufficient adhesive strength can be obtained. They suffer from further problems that adhesive strength of the adhesives after being heated is not sufficient, and the adhesive strength deteriorates upon exposure to thermal history in use environment to cause separation of the bonded materials.

The present invention has been accomplished as a result of intensive research conducted in an attempt to solve the above problems of the conventional phenolic resin-based adhesives, and the object of the present invention is to provide phenolic resin-based adhesives which are excellent in adhesive strength, especially adhesive strength after being heated, and operability, and which do not produce volatile solvents or waste water.

The present invention relates to a phenolic resin-based adhesive composition which contains a polyvinyl butyral, a novolak type phenolic resin or a novolak type phenolic resin and a resol type phenolic resin, and hexamethylenetetramine and which is prepared by melt-mixing these components, and to a phenolic resin-based adhesive composition which contains a polyvinyl butyral, an epoxy resin, a novolak type phenolic resin or a novolak type phenolic resin and a resol type phenolic resin, and hexamethylenetetramine and which is prepared by melt-mixing these components.

Preferred is a phenolic resin-based adhesive composition which contains a polyvinyl butyral, an epoxy resin, a novolak type phenolic resin, a resol type phenolic resin, and hexamethylenetetramine and which is prepared by melt-mixing these components. Furthermore, a phenolic resin-based adhesive composition which is excellent in operability and adhesive strength, especially adhesive strength after being heated, can be obtained when the hexamethylenetetramine as a hardener forms an adduct with the phenolic resin.

That is, it has been confirmed that a composition containing an epoxy resin, a novolak type phenolic resin and a resol type phenolic resin as essential components is effective for improvement of adhesive strength after being heated.

The present invention will be explained specifically below.

In the present invention, a polyvinyl butyral is added to improve peeling strength and adhesive strength under shear at room temperature of the phenolic resin-based adhesives. Its polymerization degree is preferably 200–3000. If the polymerization degree is less than 200, sufficient adhesive strength cannot be obtained, and if it exceeds 3000, viscosity of the adhesives at melting increases and it is sometimes difficult to obtain a uniform adhesive coat. Content of the polyvinyl butyral in the phenolic resin-based adhesive compositions of the present invention is 1–50 parts by weight, preferably 5–30 parts by weight based on 100 parts by weight of the phenolic resin. If the content is less than 1 part by weight, sufficient adhesive strength cannot be obtained, and if it exceeds 50 parts by weight, viscosity of the adhesives at melting increases and it is difficult to obtain a uniform adhesive coat.

The epoxy resins used in the present invention are those which have at least two epoxy groups in one molecule, and which may be solid or liquid at room temperature. Examples of the epoxy resins are those of bisphenol A type, bisphenol S type, phenol novolak type, cresol novolak type, biphenyl type, naphthalene type and aromatic amine type, which do not limit the epoxy resins used in the present invention. These can be used each alone or in combination of two or more. In the present invention, the epoxy resins are added to improve adhesive property of the phenolic resins. Content of the epoxy resins is 1–50 parts by weight, preferably 3–30 parts by weight based on 100 parts by weight of the phenolic resin. If the content is less than 1 part by weight, sufficient effect to improve the adhesive property cannot be obtained, and if it exceeds 50 parts by weight, curability of the adhesives deteriorates and sufficient adhesive strength cannot be obtained.

In the present invention, the phenolic resins are excellent in heat resistance, superior in adhesive force, and especially great in the action to absorb thermal stress at high temperatures, and as a result, have an effect to increase adhesive strength at high temperatures. The phenolic resins include novolak type phenolic resins and combinations of novolak type phenolic resins and resol type phenolic resins. Preferred are novolak type cresol-modified phenolic resins or combinations of novolak type cresol-modified phenolic resins and resol type cresol-modified phenolic resins, since they are superior in adhesive strength, particularly adhesive strength after being heated. These phenolic resins can be used in any form of liquid, solid or powder. When a novolak type phenolic resin and a resol type phenolic resin are used in combination, ratio of them is preferably 100 parts by weight or less of the resol type phenolic resin for 100 parts by weight of the novolak type phenolic resin. If amount of the resol type phenolic resin exceeds 100 parts by weight, there is caused the problem that the powdered resin is apt to absorb water or it is apt to aggregate.

As to the hardener for the novolak type phenolic resins, hexamethylenetetramine which is generally used as the hardener for novolak type phenolic resins is sometimes not used because when a resol type phenolic resin is used in combination, this also has an action as a hardener. However, in the present invention, hexamethylenetetramine is used as the hardener. Amount of the hexamethylenetetramine is 3–20 parts by weight, preferably 7–17 parts by weight based on 100 parts by weight of the novolak type phenolic resin, though it depends on the amount of the resol type phenolic resin. If the amount is less than 3 parts by weight, the adhesive hardens insufficiently, and if it exceeds 20 parts by weight, it becomes difficult to obtain a uniform adhesive layer due to the decomposition gas of hexamethylenetetramine.

When only the novolak type phenolic resin is used, similarly hexamethylenetetramine is used, and amount thereof is 3–20 parts by weight, preferably 7–17 parts by weight based on 100 parts by weight of the novolak type phenolic resin.

The process for producing the phenolic resin-based adhesive composition according to the present invention comprises uniformly melt-mixing the phenolic resin with the polyvinyl butyral, hexamethylenetetramine and, if necessary, the epoxy resin. According to a preferred example, a given amount of novolak type phenolic resin or novolak type phenolic resin and resol type phenolic resin, epoxy resin if necessary, polyvinyl butyral and hexamethylenetetramine are charged in a pressure type kneader and melt-mixed under pressure. Temperature at the mixing is suitably a temperature at which the phenolic resin melts, but does not begin to harden. Suitable pressure type kneaders are roll type kneader, pressure kneader, twin-screw extruder, single-screw extruder, etc. When the polyvinyl butyral is dispersed in the phenolic resin, viscosity of the resin abruptly increases, and hence it is difficult to uniformly disperse the polyvinyl butyral using a usual phenolic resin reaction vessel. However, by using the pressure type kneader, it becomes possible to uniformly disperse it in the phenolic resin. Furthermore, it is difficult to uniformly disperse hexamethylenetetramine in the phenolic resin and allow hexamethylenetetramine to form an adduct with the phenolic resin in a usual phenolic resin reaction vessel because of increase in viscosity of the resin or starting of gelling reaction. However, by using the pressure type kneader, it becomes possible to uniformly disperse hexamethylenetetramine in the phenolic resin and allow the hexamethylenetetramine to form an adduct with the phenolic resin.

The hexamethylenetetramine which forms an adduct with the phenolic resin as defined in the present invention means hexamethylenetetramine which cannot be extracted with deionized water. The temperature of water here is 25±1° C. Usually, hexamethylenetetramine which has been merely pulverized and mixed with the phenolic resin can be easily extracted with water, but hexamethylenetetramine which has formed an adduct, that is, has formed an intermolecular adduct with the phenolic resin, cannot be extracted with water. Thus, the adduct formation rate of hexamethylenetetramine (proportion of hexamethylenetetramine which has formed the adduct) can be obtained by the following formula.

Adduct formation rate $(\%)=[(A-B)/A]\times 100$

A: Total amount of hexamethylenetetramine.
B: Amount of hexamethylenetetramine extracted with deionized water.

A can be obtained by Kjeldahl method, liquid chromatographic method, elementary analysis method, or the like. B can be obtained by titration method on the amount of hexamethylenetetramine extracted with deionized water. Particle size of the sample in the measurement is 150 $\mu$m or less, and if the particle size is coarser, the sample is pulverized to a particle size of 150 $\mu$m or less and then the measurement is conducted.

The phenolic resin-based adhesive composition of the present invention is characterized by being obtained by melt-mixing a novolak type phenolic resin or a novolak type phenolic resin and a resol type phenolic resin, a polyvinyl butyral, and hexamethylenetetramine; or melt-mixing a novolak type phenolic resin or a novolak type phenolic resin and a resol type phenolic resin, an epoxy resin, a polyvinyl butyral and hexamethylenetetramine. Especially, when they are mixed with heating by a pressure type kneader, it becomes possible to uniformly disperse hexamethylenetetramine in the phenolic resin and form an adduct of hexamethylenetetramine with the phenolic resin. Furthermore, when the polyvinyl butyral is melt-mixed with the phenolic resin, there is the possibility that viscosity of the resin increases and they cannot be mixed in such a reaction vessel as used for the reaction of a usual phenolic resin. In this case, by using the pressure type kneader, it becomes possible to uniformly disperse the polyvinyl butyral in the phenolic resin.

The phenolic resin-based adhesive composition of the present invention exhibits good adhesive force in bonding of the same or different materials such as metals, papers, woods, and plastics, and is especially suitable for bonding of a phenolic resin molded article with a metal.

The present invention will be explained by the following examples. They should not be construed as limiting the present invention in any manner. All "part" and "%" in the examples and comparative examples are by weight.

EXAMPLE 1

800 Parts of a novolak type phenolic resin (PR-53195 manufactured by Sumitomo Durez Co., Ltd.), 200 parts of a resol type phenolic resin (PR-11078 manufactured by Sumitomo Durez Co., Ltd.), 200 parts of a polyvinyl butyral (S-LEC BX-5 manufactured by Sekisui Chemical Co., Ltd.), and 100 parts of hexamethylenetetramine were fed to a twin-screw extruder controlled to 90° C.. in inlet temperature and 100° C. in outlet temperature at an equal feeding ratio per unit time, and 1290 parts of a phenolic resin composition which was solid at room temperature was obtained from the outlet. 1000 Parts of the resulting solid phenolic resin composition was pulverized to obtain 990 parts of a powdery phenolic resin-based adhesive composition.

EXAMPLE 2

800 Parts of a novolak type phenolic resin (PR-53195 manufactured by Sumitomo Durez Co., Ltd.) and 200 parts of a resol type phenolic resin (PR-11078 manufactured by Sumitomo Durez Co., Ltd.) were charged in a pressure kneader and heated to 90° C. to melt the content. Thereto were added 200 parts of a polyvinyl butyral (DENKA BUTYRAL #5000-A manufactured by Denki Kagaku Kogyo K.K.) and 100 parts of hexamethylenetetramine, followed by mixing for 30 minutes and then taking out the mixture from the pressure kneader to obtain 1290 parts of a phenolic resin composition which was solid at room temperature. 1000 Parts of the resulting solid phenolic resin composition was pulverized to obtain 990 parts of a powdery phenolic resin-based adhesive composition.

EXAMPLE 3

1000 Parts of a novolak type phenolic resin (PR-53195 manufactured by Sumitomo Durez Co., Ltd.), 200 parts of polyvinyl butyral (S-LEC BX-1 manufactured by Sekisui Chemical Co., Ltd.), and 100 parts of hexamethylenetetramine were mixed by a roll kneader having a surface temperature of 70° C. for 20 minutes to obtain 1290 parts of a phenolic resin composition which was solid at room temperature. 1000 Parts of the resulting solid phenolic resin composition was pulverized to obtain 990 parts of a powdery phenolic resin-based adhesive composition.

EXAMPLE 4

500 Parts of phenol, 500 parts of cresol, 630 parts of 37% formalin and 5 parts of oxalic acid were charged in a reactor equipped with a stirrer, a reflux condenser and a thermometer, and gradually heated up to 100° C. and then subjected to reflux reaction for 180 minutes. Atmospheric dehydration was carried out until internal temperature reached 110° C. and then vacuum dehydration was carried out, and when the temperature in the system rose to 160° C., the content was taken out of the reactor to obtain 1070 parts of a novolak type cresol-modified phenolic resin which was solid at room temperature.

800 Parts of the novolak type cresol-modified phenolic resin obtained above, 200 parts of a resol type cresol-modified phenolic resin (PR-175 manufactured by Sumitomo Durez Co., Ltd.), 200 parts of a polyvinyl butyral (S-LEC BX-5 manufactured by Sekisui Chemical Co., Ltd.), 100 parts of an epoxy resin (ARALDITE AER6051 manufactured by Asahi Ciba Co., Ltd.) and 100 parts of hexamethylenetetramine were fed to a twin-screw extruder controlled to 90° C. in inlet temperature and 100° C. in outlet temperature at an equal feeding ratio per unit time, and 1290 parts of a phenolic resin composition which was solid at room temperature was obtained from the outlet. 1000 Parts of the resulting solid phenolic resin composition was pulverized to obtain 990 parts of a powdery phenolic resin-based adhesive composition.

EXAMPLE 5

800 Parts of the novolak type cresol-modified phenolic resin and 200 parts of the resol type cresol-modified phenolic resin (PR-175 manufactured by Sumitomo Durez Co., Ltd.) respectively used in Example 4 were charged in a pressure kneader and heated to 90° C. to melt the content. Thereto were added 200 parts of a polyvinyl butyral (DENKA BUTYRAL #5000-A manufactured by Denki Kagaku Kogyo K.K.), 100 parts of an epoxy resin (ARALDITE ECN1280 manufactured by Asahi Ciba Co., Ltd.) and 100 parts of hexamethylenetetramine, followed by mixing for 30 minutes and then taking out the mixture from the pressure kneader to obtain 1290 parts of a phenolic resin composition which was solid at room temperature. 1000 Parts of the resulting solid phenolic resin composition was pulverized to obtain 990 parts of a powdery phenolic resin-based adhesive composition.

EXAMPLE 6

1000 Parts of the novolak type cresol-modified phenolic resin used in Example 4, 200 parts of a polyvinyl butyral (S-LEC BX-1 manufactured by Sekisui Chemical Co., Ltd.), 100 parts of an epoxy resin (ARALDITE AER6017 manufactured by Asahi Ciba Co., Ltd.) and 100 parts of hexamethylenetetramine were mixed by a roll kneader having a surface temperature of 70° C. for 20 minutes to obtain 1290 parts of a phenolic resin composition which was solid at room temperature. 1000 Parts of the resulting solid phenolic resin composition was pulverized to obtain 990 parts of a powdery phenolic resin-based adhesive composition.

Comparative Example 1

800 Parts of a novolak type phenolic resin (PR-53195 manufactured by Sumitomo Durez Co., Ltd.), 200 parts of a resol type phenolic resin (PR-11078 manufactured by Sumitomo Durez Co., Ltd.), 200 parts of a polyvinyl butyral (S-LEC BX-5 manufactured by Sekisui Chemical Co., Ltd.), and 100 parts of hexamethylenetetramine were charged in a pulverizer and pulverized to obtain 1290 parts of a powdery phenolic resin-based adhesive composition.

Comparative Example 2

1000 Parts of a novolak type phenolic resin (PR-53195 manufactured by Sumitomo Durez Co., Ltd.) was charged in a reactor equipped with a stirrer, a reflux condenser and a thermometer, and heated to 150° C. to melt it. Then, 200 parts of a polyvinyl butyral (S-LEC BX-5 manufactured by Sekisui Chemical Co., Ltd.) was added, followed by stirring for 5 hours and taking out the content from the reactor to obtain 1190 parts of a phenolic resin which was solid at room temperature. To 1000 parts of the resulting solid phenolic resin was added 100 parts of hexamethylenetetramine, followed by pulverization to obtain 1090 parts of a powdery phenolic resin-based adhesive composition.

The eight kinds of powdery phenolic resin-based adhesive compositions obtained in Examples 1–6 and Comparative Examples 1 and 2 were subjected to measurement on the adduct formation rate and the tensile adhesive strength of the adhesives without exposing to thermal history in accordance with JIS K6849. Furthermore, adhesive strength after exposing to thermal history of 250° C. for 2 hours was measured in accordance with JIS K6849. Bonding conditions were as follows: Steel sheets (JIS G3141) were bonded under heating conditions of 190° C. for 60 minutes and pressure condition of 1.47 MPa. The results are shown in Table

TABLE 1

|  | Example 1 | Example 2 | Example 3 | Example 4 | Example 5 | Example 6 | Comparative Example 1 | Comparative Example 2 |
| --- | --- | --- | --- | --- | --- | --- | --- | --- |
| Adduct formation rate (%) | 58 | 63 | 61 | 58 | 63 | 61 | 0 | 0 |
| Adhesive strength without exposing to thermal history (MPa) | 16 | 15 | 16 | 15 | 15 | 16 | 10 | 12 |
| Adhesive strength after exposing to thermal history (MPa) | 6 | 7 | 7 | 10 | 11 | 11 | 3 | 4 |

Since the adhesives used in the examples were all powdery, no drying step was needed and no waste water was produced.

The adhesives obtained in Examples 1–6 were high in the adduct formation rate and excellent in both adhesive strength without exposing to thermal history and adhesive strength after exposing to thermal history. On the other hand, the adhesives obtained in Comparative Examples 1 and 2 were low in the adduct formation rate and inferior in both adhesive strength without exposing to thermal history and adhesive strength after exposing to thermal history.

As can be seen from the above examples, the phenolic resin-based adhesive compositions of the present invention have good adhesive strength without exposing to thermal history and adhesive strength after exposing to thermal history, are excellent in operability, and produce neither volatile solvents nor waste water.

The adhesive compositions of the present invention are suitable for bonding metals, papers, woods, plastics, etc., and especially suitable for bonding a phenolic resin molded article to a metal.

What is claimed is:

1. A phenolic resin-based adhesive composition, comprising a polyvinyl butyral, a novolak phenolic resin and hexamethylenetetramine, wherein the composition is obtained by uniformly melt-mixing the components, and wherein the hexamethylenetetramine forms an adduct with the phenolic resin.

2. A phenolic resin-based adhesive composition, comprising a polyvinyl butyral, a novolak phenolic resin, a resol phenolic resin and hexamethylenetetramine, wherein the composition is obtained by uniformly melt-mixing the components, and wherein the hexamethylenetetramine forms an adduct with the phenolic resin.

3. A process for producing the phenolic resin-based adhesive composition according to claim 1, comprising melt-mixing the components using a pressure kneader.

4. A phenolic resin-based adhesive composition, comprising a polyvinyl butyral, an epoxy resin, a novolak phenolic resin and hexamethylenetetramine, wherein the composition is obtained by melt-mixing the components, and wherein the hexamethylenetetramine forms an adduct with the phenolic resin.

5. A phenolic resin-based adhesive composition, comprising a polyvinyl butyral, an epoxy resin, a novolak phenolic resin, a resol phenolic resin and hexamethylenetetramine, wherein the composition is obtained by melt-mixing the components, and wherein the hexamethylenetetramine forms an adduct with the phenolic resin.

6. The phenolic resin-based adhesive composition according to claim 4, wherein the novolak phenolic resin is a novolak cresol-modified phenolic resin.

7. The phenolic resin-based adhesive composition according to claim 5, wherein the novolak phenolic resin is a novolak cresol-modified phenolic resin and the resol phenolic resin is a resol cresol-modified phenolic resin.

8. A process for producing the phenolic resin-based adhesive composition according to claim 4, comprising melt-mixing the components using a pressure kneader.

9. A process for producing the phenolic resin-based adhesive composition according to claim 2, comprising melt-mixing the components using a pressure kneader.

10. A process for producing the phenolic resin-based adhesive composition according to claim 5, comprising melt-mixing the components using a pressure kneader.

11. A phenolic resin-based adhesive composition, made by a process comprising:

melt-mixing a polyvinyl butyral, a novolak phenolic resin and hexamethylenetetramine; and pulverizing the resulting solid to obtain a powdery phenolic resin-based adhesive composition, wherein the hexamethylenetetramine forms an adduct with the phenolic resin.

12. A phenolic resin-based adhesive composition, made by a process comprising:

melt-mixing a polyvinyl butyral, a novolak phenolic resin, a resol phenolic resin and hexamethylenetetramine; and pulverizing the resulting solid to obtain a powdery phenolic resin-based adhesive composition, wherein the hexamethylenetetramine forms an adduct with the phenolic resin.

13. A phenolic resin-based adhesive composition, made by a process comprising:

melt-mixing a polyvinyl butyral, an epoxy resin, a novolak phenolic resin and hexamethylenetetramine; and pulverizing the resulting solid to obtain a powdery phenolic resin-based adhesive composition, wherein the hexamethylenetetramine forms an adduct with the phenolic resin.

14. A phenolic resin-based adhesive composition, made by a process comprising:

melt-mixing a polyvinyl butyral, an epoxy resin, a novolak phenolic resin, a resol phenolic resin and hexamethylenetetramine; and pulverizing the resulting solid to obtain a powdery phenolic resin-based adhesive composition, wherein the hexamethylenetetramine forms an adduct with the phenolic resin.

15. The phenolic resin-based adhesive composition according to claim 13, wherein the novolak phenolic resin is a novolak cresol-modified phenolic resin.

16. The phenolic resin-based adhesive composition according to claim 14, wherein the novolak phenolic resin is a novolak cresol-modified phenolic resin and the resol phenolic resin is a resol cresol-modified phenolic resin.

* * * * *